(12) United States Patent
Depondt

(10) Patent No.: US 9,114,783 B2
(45) Date of Patent: Aug. 25, 2015

(54) WIPER BLADE HAVING AN ADAPTER UNIT FOR ATTACHING TO A WIPER ARM

(75) Inventor: Helmut Depondt, Kessel-Lo (BE)

(73) Assignee: Robert Bosch GmbH, Stuttgart (DE)

( * ) Notice: Subject to any disclaimer, the term of this patent is extended or adjusted under 35 U.S.C. 154(b) by 107 days.

(21) Appl. No.: 13/143,968

(22) PCT Filed: Dec. 14, 2009

(86) PCT No.: PCT/EP2009/067031
§ 371 (c)(1),
(2), (4) Date: Jul. 11, 2011

(87) PCT Pub. No.: WO2010/091757
PCT Pub. Date: Aug. 19, 2010

(65) Prior Publication Data
US 2012/0180248 A1    Jul. 19, 2012

(30) Foreign Application Priority Data
Feb. 13, 2009  (DE) .......................... 10 2009 000 860

(51) Int. Cl.
*B60S 1/38*  (2006.01)
*B60S 1/40*  (2006.01)

(52) U.S. Cl.
CPC .. *B60S 1/387* (2013.01); *B60S 1/40* (2013.01); *B60S 1/4067* (2013.01); *B60S 1/3806* (2013.01); *B60S 1/3863* (2013.01); *B60S 1/3874* (2013.01)

(58) Field of Classification Search
CPC ...... B60S 1/3806; B60S 1/381; B60S 1/3863; B60S 1/3808; B60S 1/3881; B60S 1/3849–1/386

USPC .......................... 15/250.32, 250.43, 250.361, 15/250.44–250.48, 250.201
See application file for complete search history.

(56) References Cited

U.S. PATENT DOCUMENTS

| 2,701,382 | A | * | 2/1955 | Oishei | ........................ | 15/250.43 |
| 5,383,249 | A | * | 1/1995 | Yang | ........................ | 15/250.201 |
| 2006/0021178 | A1 | * | 2/2006 | Verelst et al. | ............... | 15/250.32 |
| 2007/0192983 | A1 | * | 8/2007 | Chen | ........................ | 15/250.001 |

(Continued)

FOREIGN PATENT DOCUMENTS

| CN | 1784326 | 6/2006 |
| CN | 101253082 | 8/2008 |

(Continued)

OTHER PUBLICATIONS

DE102007021333A1 (machine translation), 2008.*

(Continued)

*Primary Examiner* — Mark Spisich
*Assistant Examiner* — Andrew A Horton
(74) *Attorney, Agent, or Firm* — Michael Best & Friedrich LLP

(57) ABSTRACT

The invention relates to a wiper blade (10) for a windshield wiper, having a wiper strip (12) and an adapter unit (50) for attaching the wiper strip (12) to a wiper arm, wherein the adapter unit (50) is attached at a base connection device (60) provided on the wiper strip (12), wherein the adapter unit (50) comprises a first adapter holder (52) and a second adapter holder (58) mounted on the base connection device (60) at a distance from each other, and catch elements (51, 59) facing each other, on which a connection element (55) associated with the adapter unit (50) is engaged for connecting with the wiper arm.

17 Claims, 5 Drawing Sheets

(56) References Cited

U.S. PATENT DOCUMENTS

| | | |
|---|---|---|
| 2008/0263806 A1 * | 10/2008 | Egner-Walter et al. .... 15/250.01 |
| 2008/0313841 A1 * | 12/2008 | De Block et al. .......... 15/250.32 |
| 2009/0113653 A1 | 5/2009 | Thienard |

FOREIGN PATENT DOCUMENTS

| | | | | |
|---|---|---|---|---|
| DE | 102005060664 | | 6/2007 | |
| DE | 102005062463 A1 * | | 6/2007 | ................ B60S 1/40 |
| DE | 102006038828 | | 2/2008 | |
| DE | 102006047633 | | 4/2008 | |
| DE | 102007021333 A1 * | | 11/2008 | ................ B60S 1/40 |
| EP | 1795406 A1 * | | 6/2007 | ................ B60S 1/40 |
| FR | 2890026 | | 3/2007 | |
| FR | 2915445 A1 * | | 10/2008 | ................ B60S 1/38 |
| RU | 2007127898 | | 1/2009 | |
| WO | WO 2008043622 A1 * | | 4/2008 | ................ B60S 1/38 |

OTHER PUBLICATIONS

DE102005062463A1 (machine translation), 2007.*
WO2008043622 (machine translation), 2008.*
Definition of spoiler in the Free Online Encyclopedia, 2014.*
PCT/EP2009/067031 International Search Report.

* cited by examiner

WIPER BLADE HAVING AN ADAPTER UNIT FOR ATTACHING TO A WIPER ARM

REFERENCE TO RELATED APPLICATIONS

This application is a 371 of PCT/EP2009/067031, filed on Dec. 14, 2009, and claims the benefit of German application No. 102009000860.8, filed on Feb. 13, 2009.

BACKGROUND OF THE INVENTION

The present invention relates to a wiper blade for a windshield wiper, having a wiper strip and an adapter unit for attaching the wiper strip to a wiper arm, wherein the adapter unit is attached at a base connection device provided on the wiper strip.

The World Intellectual Property Organization patent publication WO 2008/145481 describes such a wiper blade having a wiper strip, which is provided with a connectable base connection device having an adapter unit. The adapter unit is attached at the base connection device via a snap connection. In doing so, said adapter unit has two snap lock pins having widened, arc-shaped ends and said base connection device comprises two associated snap-action holders having resilient holding arms, wherein in each case two holding arms having an arc-shaped protrusion configure a snap-action holder. When attaching the adapter unit at the base connection device, said adapter unit is initially mounted with a front axial end region at a specified angle on said base connection device and then turned with the rear axial end region thereof in the direction of said base connection device until the snap lock pins rest against the snap-action holders. The snap lock pins are then pushed against the associated snap-action holders, the arc-shaped ends of the snap lock pins initially bending the resilient holding arms of the associated snap-action holder apart and then ultimately engaging in the corresponding arc-shaped protrusions. In the process, the holding arms spring back into their starting position and enclose the arc-shaped ends of the snap lock pins, which engage in the arc-shaped protrusions.

A disadvantage of the prior art is that a combination of various movement procedures is required to attach the adapter unit at the base connection device of the wiper blade, i.e. initially a mounting at a specified angle, then a turning motion and finally a somewhat linear motion while applying a specified pressure. The manipulation of the adapter unit is therefore difficult and the mounting of the wiper blade is time consuming and complicated. Moreover, damage or destruction of individual components of the snap connection is, for example, possible should the adapter unit be canted on the base connection device as a result of the pressure required to achieve the linear motion.

SUMMARY OF THE INVENTION

It is therefore an aim of the invention to provide a new wiper blade for a windshield wiper having an adapter unit, which is easy to handle and can be quickly and reliably attached at a base connection device, which is provided on a wiper strip.

This aim is met by a wiper blade for a windshield wiper comprising a wiper strip and an adapter unit for attaching the wiper strip to a wiper arm. The adapter unit is attached at a base connection device provided on said wiper strip. Said adapter unit comprises a first adapter holder and a second adapter holder, which are mounted on the base connection device at a distance from each other and have catch elements facing each other, on which a connection element associated with said adapter unit is engaged for connecting with the wiper arm.

The invention therefore makes possible the provision of a wiper blade having an adapter unit which can be mounted in a simple way and which can be reliably and stably attached to the wiper blade.

According to one embodiment, the first and second adapter holders are permanently engaged at the base connection device. The connection element is detachably engaged at the first and second adapter holder.

A connection element can consequently be provided which can reliably be connected to the first and second adapter holder and can be easily separated again from them.

The connection element preferably comprises counter catch elements, which engage with the catch elements of the adapter holders. The counter catch elements can preferably be actuated in order to facilitate the release of an existing engagement between the counter catch elements and the catch elements.

A simply constructed, cost-effective connection element can therefore be provided.

According to one embodiment, the catch elements comprise projections facing the connection element and the counter catch elements contain resilient detent tongues which are lockably engaged on the projections.

The invention therefore enables the provision of an adapter unit having a simple and uncomplicated construction.

A distance is preferably provided in the axial direction of the wiper strip between the first and second adapter holder, which substantially corresponds to a longitudinal extension of the connection element.

The connection element can thus be disposed in a simple manner between the first and second adapter holder, wherein a positively locking connection between the adapter holders and said connection element can be established when the adapter holders and the connection element are appropriately configured.

The first and the second adapter holder preferably have at least in sections a longitudinal groove for receiving the end regions facing the base connection device of a spoiler provided on the wiper strip.

An optically pleasing connection between the adapter holders and the wiper strip can therefore be achieved.

The connection element preferably comprises a bearing element, at which a connecting member associated with the wiper arm can be supported.

In so doing, the wiper blade can simply and reliably be attached to a corresponding wiper arm.

According to one embodiment, the wiper strip including the base connection device provided thereon is embodied in a jointless manner, wherein the base connection device is preassembled on the wiper strip.

The invention consequently enables the provision of a wiper blade, wherein the adapter unit can be simply and quickly attached at the preassembled base connection device.

The problem mentioned at the beginning of the application is also solved by means of an adapter unit for attaching a wiper strip associated with a wiper blade for a windshield wiper to a wiper arm, wherein the adapter unit is attachable at a base connection device provided on the wiper strip, thereby characterized in that a first adapter holder and a second adapter holder are provided, which can be mounted on the base connection device at a distance from each other and comprise catch elements, on which a connection element, which can be mounted between the first and second adapter holder, can be engaged to provide a connection to the wiper arm.

BRIEF DESCRIPTION OF THE DRAWINGS

The invention is explained in detail in the following description with the aid of the exemplary embodiments depicted in the drawings. The following are shown.

DETAILED DESCRIPTION

Figure 1:
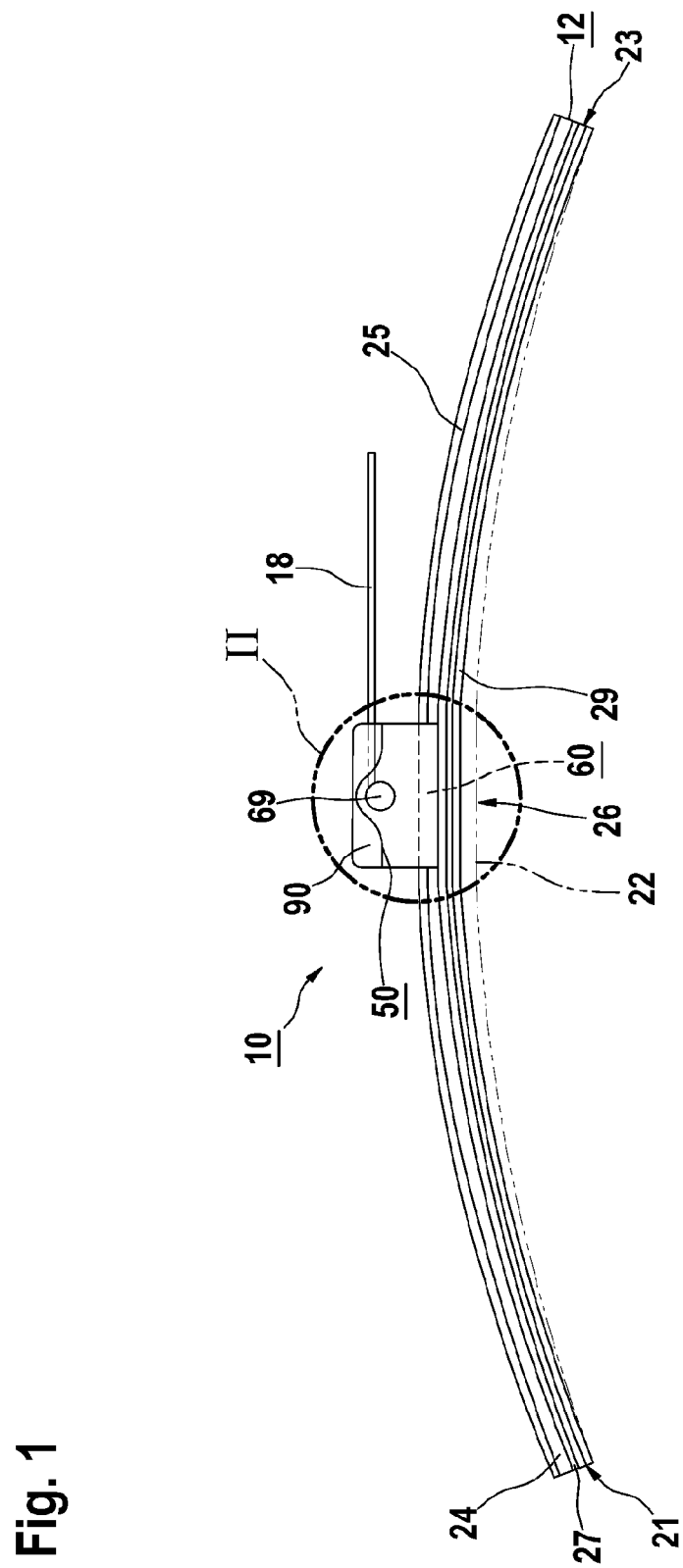
FIG. 1 a side view of a wiper blade comprising a wiper strip to which a base connection device is attached and an adapter unit according to the invention, FIG. 2 a perspective view of a section ** of FIG. 1 in the unassembled state comprising the wiper strip provided with the base connection device of FIG. 1 and the adapter unit according to one embodiment, FIG. 3 a perspective view of the wiper strip of FIG. 2 when mounting the adapter holder of FIG. 2, FIG. 4 a perspective view of the wiper strip of FIG. 2 comprising mounted adapter holders when mounting the connection element of FIG. 2 and FIG. 5 a perspective view of the wiper strip of FIG. 4 comprising the mounted adapter holders when engaging the connection element of FIG. 2 on said adapter holders.

FIG. 1 shows a wiper blade 10 comprising a wiper strip 12, which has a wiper lip 29 which is connected to a back strip 24 via a swiveling web 27. A spoiler 25 is provided on the back strip 24. A base connection device 60, at which an adapter unit 50 for connecting a connecting member 90 provided on a wiper arm 18 is attached, is provided on the wiper strip 12. The connecting member 90 is connected by way of example to the adapter unit 50 via a pivot bolt 69. With the help of the wiper arm 18, the wiper blade 10 can be guided to wipe over the window pane 22 depicted with a dotdashed line, e.g. a motor vehicle window pane.

According to one embodiment, the wiper blade 10 is of flat bar design, i.e. the wiper strip 12 has lateral longitudinal grooves, in which two mounting rails, preferably spring rails, are disposed. Alternatively to this, said wiper strip 12 can be embodied as a hollow profile comprising an approximately central longitudinal channel, in which a single mounting rail is disposed. Said wiper strip 12 including the base connection device 60 provided thereon is preferably embodied in a jointless manner, said base connection device 60 being preferably preassembled on said wiper strip 12.

In FIG. 1, the wiper blade 10 has not yet completely been placed on the window pane 22. Only the axial wiper blade ends 21, 23 are resting on the window pane 22, while the wiper strip 12 is still spaced apart from said window pane 22 at the wiper blade center 26, i.e. approximately in the region of the adapter unit 50. If provision is made for a contact pressing force to be exerted on the connecting member 90 and thereby on the adapter unit 50 via the wiper arm 18, the wiper strip 12 lays down on the window pane 22. In so doing, a uniform contact pressure is achieved over the entire length of the wiper blade even if the curvature of the window pane changes in the course of the wiper motion.

Figure 2:
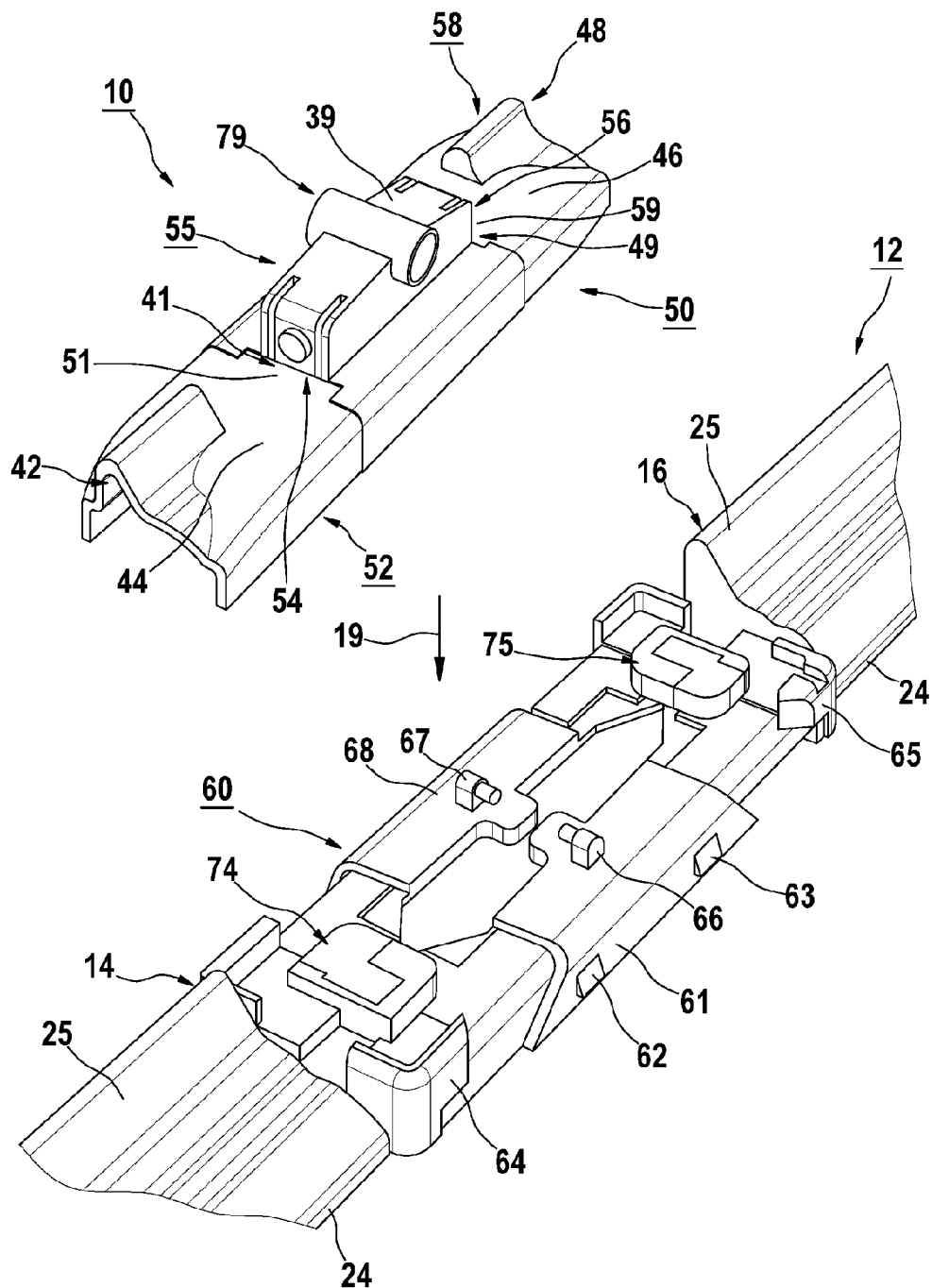

In accordance with one embodiment, FIG. 2 shows a section of the wiper blade 10, which in FIG. 1 is designated by the symbol **, comprising the wiper strip 12 and the adapter unit 50. In order to assemble the wiper blade 10 of FIG. 1, the adapter unit 50 is to be attached to the wiper strip 12, which is provided with the base connection device 60, in the direction of the arrow 19.

As can be seen in FIG. 2, the spoiler 25 provided on the back strip 24 of the wiper strip 12 has a break in the region of the base connection device 60. This break comprises a first end region 14 which faces said base connection device 60 and a second end region 16 which faces said base connection device 60. Said base connection device 60 consists by way of example of a first connecting rail 61 and a second connecting rail 68.

The connecting rail 61 comprises by way of example two lateral positioning members 62, 63 and a positioning member 66 which faces the adapter unit 50. Shoulders 64 and accordingly 65, are configured on axial end regions of the rails 61. The connecting rail 68 is similarly constructed and consequently comprises corresponding positioning members on shoulders configured on axial end regions. In FIG. 2 only a positioning element 67 which faces said adapter unit 50 can, however, be seen.

The connecting rails 61, 68 encompass at least in sections the back strip 24 of the wiper strip 12 and are preferably fixedly anchored against one another and thereby anchored to said back strip 24, e.g. permanently engaged, wherein a first and a second columnar fixing member 74, 75 are formed. In order to establish a permanent engagement, the rails 61, 68 preferably have suitable detent and counter detent means. It is, however, to be noted that the anchoring of said rails 61, 68 against one another can be achieved with other equivalent means, e.g. with snap or clamping connections. The present invention is therefore not limited to the use of detent and counter detent means.

The adapter unit 50 is, for example, manufactured from plastic and preferably comprises a first adapter holder 52, a connection element 56 and a second adapter holder 58, the top faces of which 44, 39 and accordingly 46 are shown in FIG. 2. The first adapter holder 52 comprises a first catch element 51 having a projection 41 configured on the top face 44 of the holder 52. In order to receive the end region 14 of the spoiler 25 which faces the base connection device 60, a longitudinal groove 42 is configured on said first adapter holder 52 at least in a specified region as described below with regard to FIG. 3. Analogous to this, the second adapter holder 58 comprises a second catch element 59 having a projection 49 configured on the top face 46 of the holder 58. In order to receive the end region 16 of the spoiler 25 which faces said base connection device 60, a longitudinal groove 48 is configured on the second adapter holder 58 at least in a specified region as described below with regard to FIG. 3.

According to one embodiment, the connection element 55 can be fastened to, preferably lockably engaged with, the catch elements 51, 59. For this purpose, two counter catch elements 54, respectively 56, facing the catch elements 51, 59 are provided on the connection element 56, said counter catch elements 54, 56 being able to lockably engage with said catch elements 51, 59 as described below with regard to FIG. 5. Said connection element 55 preferably comprises a bearing element 79, whereat the connecting member 90 of FIG. 1, which is associated with the wiper arm 18 of FIG. 1, can be supported.

Figure 3:
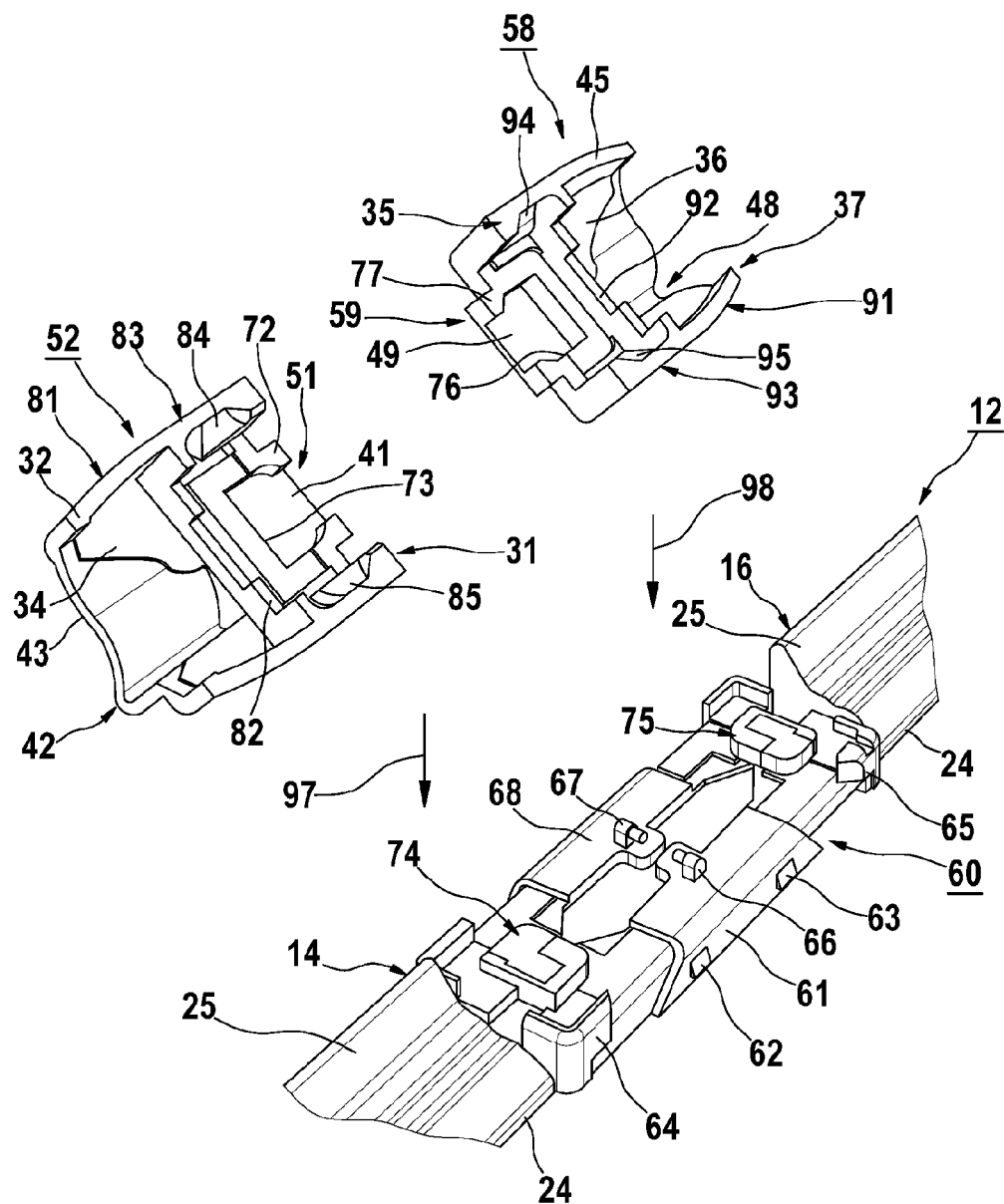

FIG. 3 shows the section of the wiper strip 12 including the base connection device 60 of FIG. 2 when mounting the adapter holders 52, 58. These are pressed down with the bottom sides thereof 34 or 36 in the directions of the arrows 97 or 98 onto the wiper strip 12 and the axial end regions of the base connection device 60 and fixedly anchored there, as described below.

According to one embodiment, the adapter holder 52 comprises a housing 43, which is open towards the bottom side 34 thereof, comprising the side walls 31, 32. The housing 43 comprises by way of example a first housing section 81, which is separated from a second housing section 83 by a wall element 82. The longitudinal groove 42 is provided on the first housing section 81, which preferably extends up to the wall element 82. The second housing section 83 is approximately U-shaped and has a boundary 73, which forms an opening 72 at the projection 41. The opening 72 and said projection 41 form by way of example the catch element 51. Detent tongues 85, respectively 84, are preferably configured on said side walls 31, 32 in the region of said second housing section 83.

When attaching the adapter holder 52 to the wiper strip 12 and the base connection device 60, the end region 14 of the spoiler 25 is disposed in the longitudinal groove 42 such that the boundary 73 encompasses the first fixing member 74. By means of pressure exerted in the direction of the arrow 97 on said adapter holder 52 positioned in the aforementioned manner, said holder 52 is now moved relative to said base connection device 60 such that the detent tongue 84 engages below the shoulder 64 and the detent tongue 85 engages below a corresponding shoulder on the connecting rail 68. In so doing, said adapter holder 52 is lockably engaged in a permanent manner with said base connection device 60.

The adapter holder 58 is preferably embodied mirror-symmetrically to the adapter holder 52 and comprises a housing 45 which is open towards the bottom side 36 thereof and includes the side walls 37, 35. The housing 45 comprises by way of example a first housing section 91, which is separated from a second housing section 93 by a wall element 92. The longitudinal groove 48, which preferably extends up to the wall element 92, is provided on the first housing section 91. The second housing section 93 is formed approximately U-shaped and has a boundary 76 which forms an opening 77 at the projection 49. The opening 77 and the projection 49 form by way of example the catch element 59. In the region of the second housing section 93, detent tongues 95 or 94 are preferably configured on said side walls 37, 35.

When attaching the adapter holder 58 to the wiper strip 12 and to the base connection device 60, the end region 16 of the spoiler 25 is disposed in the longitudinal groove 48 in such a way that the boundary 76 encompasses the second fixing member 75. By means of pressure exerted in the direction of the arrow 98 on said adapter holder 58 positioned in the aforementioned manner, said holder 58 is now moved relative to said base connection device 60 such that the detent tongue 94 engages below the shoulder 65 and the detent tongue 95 engages below a corresponding shoulder on the connecting rail 68. In so doing, said adapter holder 58 is lockably engaged in a permanent manner with said base connection device 60.

Figure 4:
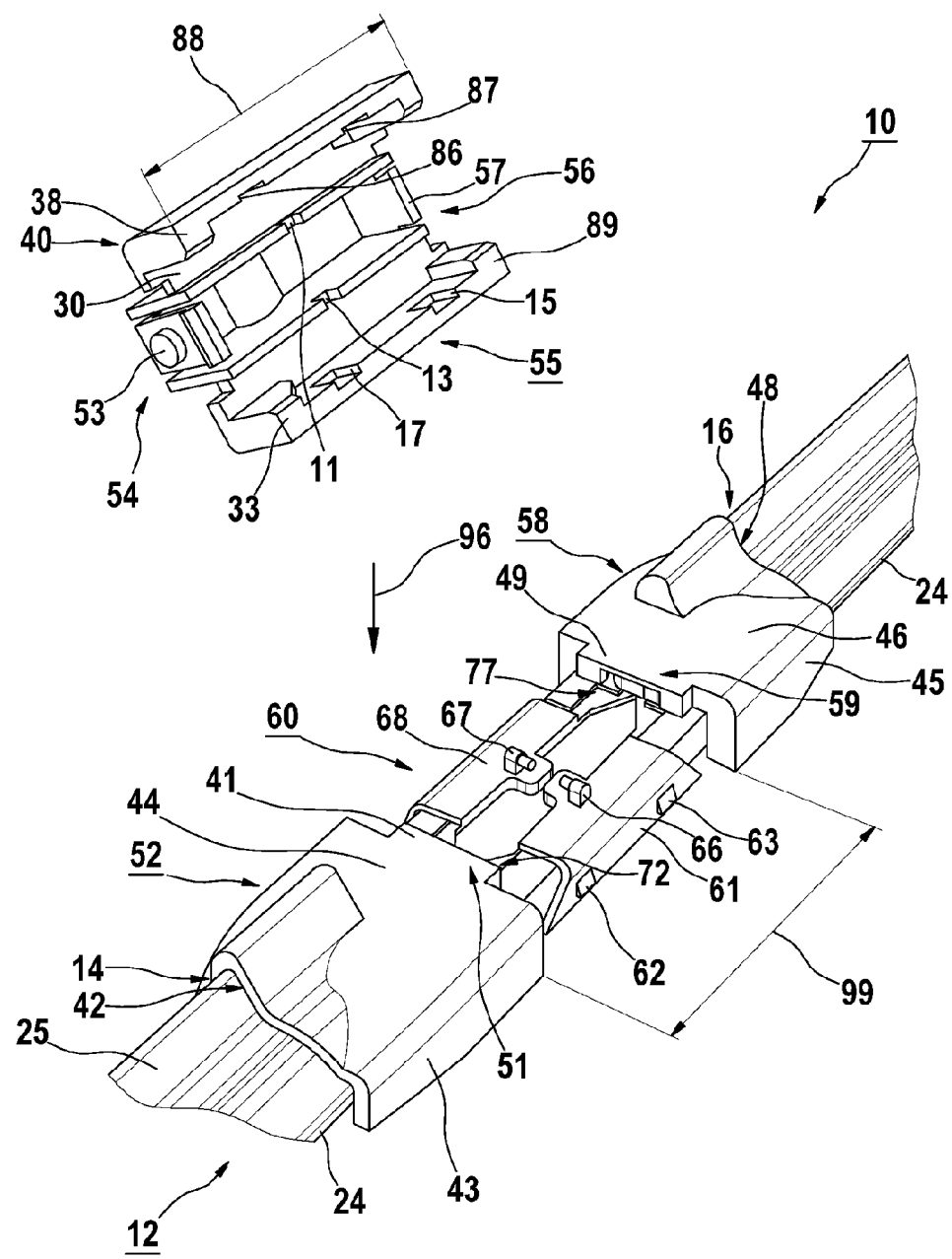

FIG. 4 shows the section of the wiper strip 12 comprising the base connection device 60 and the adapter holders 52, 58 of FIG. 2, which are lockably engaged in a permanent manner therewith, during assembly of the connection element 55 of FIG. 2. Said connection element 55 is used to provide connection to the wiper arm 18 of FIG. 1 or to the connection member 90 attached thereon and is positioned during assembly with the bottom side 30 thereof in the direction of the arrow 96 on said wiper strip 12 in an approximately central region of the base connection device 60. Said connection element 55 is lockably engaged there with the opposing catch elements 51, 59 of the adapter holders 52 or 58, preferably in a detachable manner as described below.

According to one embodiment, the connection element 55 comprises a housing 40 which includes the side walls 33, 38 and is open towards the bottom side 30. The counter catch elements 54, 56 are configured on the axial ends of the housing 40. These have by way of example resilient detent tongues 53 or 57. Adjusting members 11, 13 are provided approximately centrally on said bottom side 30 of said housing 40. Guide grooves 15, 17 are configured on the side wall 33 and guide grooves 86, 87 are provided on the side wall 38.

The connection element 55 preferably includes a longitudinal extension 88 which substantially corresponds to a distance 99 provided in the axial direction of the wiper strip 12 between the first and second adapter holder 52, 58. This makes a positively locking connection of said connection element 55 with the adapted holders 52, 58 possible.

When attaching the connection element 55 to the adapter holders 52, 58, said connection element 55 is preferably pushed with the bottom side 30 thereof onto the central region of the base connection device 60 in the direction of the arrow 96. In so doing, the positioning members 62, 63 provided on the connecting rail 61 engage in the guide grooves 86 or 87 to guide said connection element 55. Analogous to this, the positioning members provided on the connecting rail 68 engage in the guide grooves 15, 17. Said positioning members 66, 67 engage in the adjusting members 11 or 13.

Figure 5:
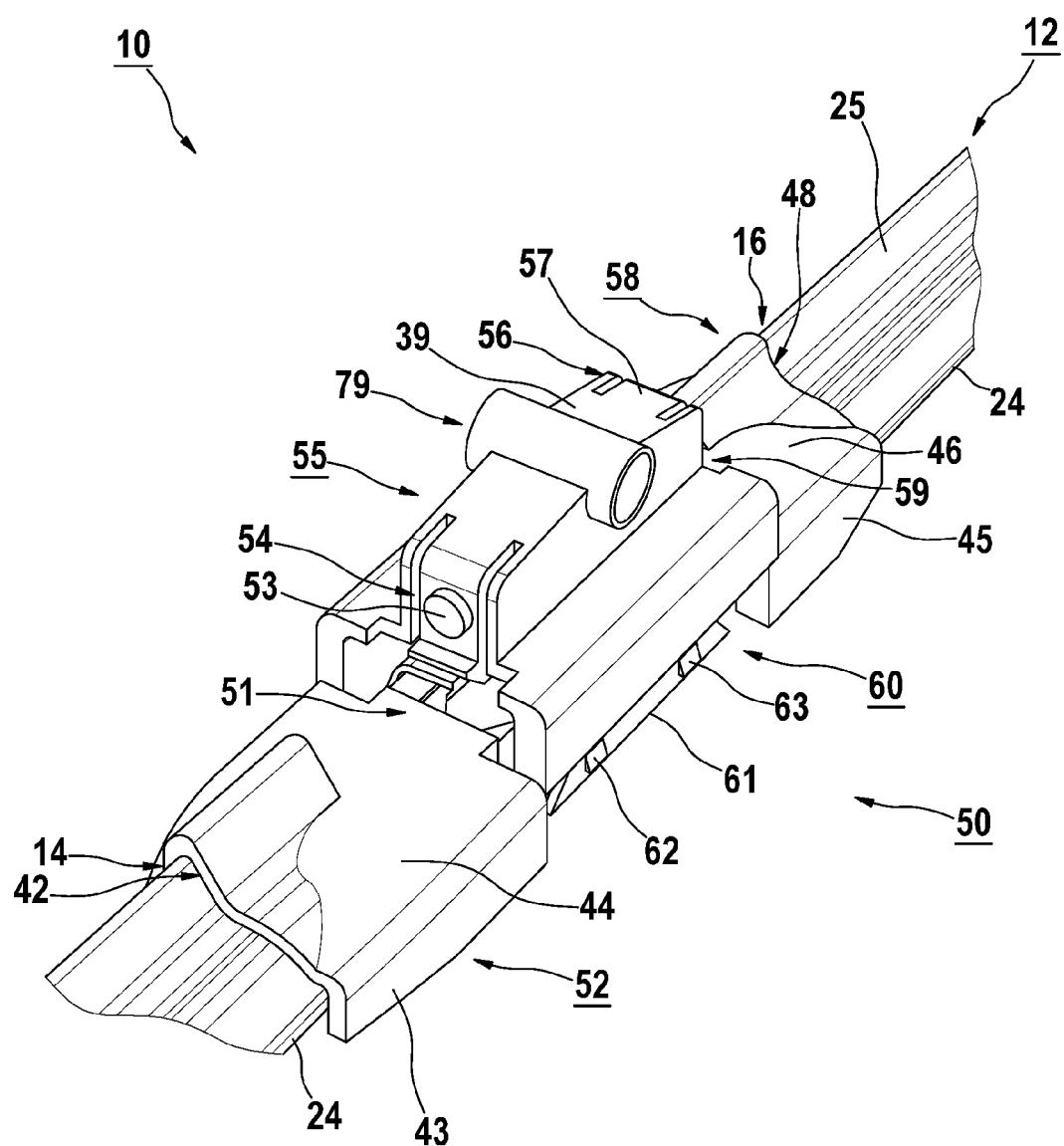

FIG. 5 shows the connection element 55 as described with regard to FIG. 4, which is positioned on the wiper strip 12 comprising the base connection device 60 and the adapter holders 52, 56 lockably engaged in a permanent manner therewith. According to one embodiment, the resilient detent tongues 53, 57 provided on the connection element 55 can be actuated, preferably can be compressed, in the axial direction of the wiper strip 12 or the connection element 55. It is therefore possible to push the connection element 55 between the adapter holders 52, 58 such that said detent tongues 53, 57 engage below the projections 41 or 49 and can lockably engage on the same. Analogous thereto, this lockable engagement can likewise be released by actuating said detent tongues 53, 57 and by pulling off, respectively removing, said connection element 55.

The invention claimed is:

1. A wiper blade (10) for a windshield wiper, the wiper blade comprising a wiper strip (12) having an axial direction, a base connection device (60) mounted on the wiper strip, a spoiler (20) mounted on the wiper strip, and an adapter unit (50) for attaching the wiper strip (12) to a wiper arm (18), wherein the spoiler includes first and second spoiler sections that are spaced apart in the axial direction, wherein the base connection device is located entirely between the spoiler sections, wherein the adapter unit (50) is mounted on the base connection device (60), wherein the adapter unit (50) comprises a first adapter holder (52), a second adapter holder (58) and a connection element (55) each formed separately from the base connection device (60), each formed separately from each other and each mounted on the base connection device (60), wherein the first adapter holder (52) and the second adapter holder (58) are mounted on the base connection device independently of the connection element at a distance from each other in the axial direction of the wiper strip and have respective catch elements (51, 59) facing each other, wherein the connection element (55) is mounted on the base connection device between the first adapter holder (52) and the second adapter holder (58) and engages the catch elements (51, 59) of the first and second adapter holders, wherein the connection element (55) is configured to connect with the wiper arm (18), wherein the first and second adapter holders are respectively adjacent to and separate from the first and second spoiler sections, wherein the connection element (55) comprises counter catch elements (54, 56) which are engaged with the catch elements (51, 59) of the adapter holders (52, 58), and wherein the catch elements (51, 59) comprise projections (41, 49) facing the connection element (55) and the counter catch elements (54, 56) comprise resilient detent tongues (53, 57) which are engaged on the projections (41, 49).

2. A wiper blade according to claim 1, thereby characterized in that the first and second adapter holder (52, 58) are permanently engaged at the base connection device (60) and the connection element (55) is detachably engaged at the first and second adapter holder (52, 58).

3. A wiper blade according to claim 1, thereby characterized in that the counter catch elements (54, 56) can be actuated in order to enable a release of a present engagement between said counter catch elements (54, 56) and the catch elements (51, 59).

4. A wiper blade according to claim 1, thereby characterized in that the distance (99) in the axial direction of the wiper strip (12) between the first and second adapter holder (52, 58) substantially corresponds to a longitudinal extent (88) of the connection element (55).

5. A wiper blade according to claim 1, thereby characterized in that the first and second adapter holder (52, 58) each include a longitudinal groove (42, 48) for receiving a respective one of end regions (14, 16) of the spoiler (20) provided on the wiper strip (12).

6. A wiper blade according to claim 1, thereby characterized in that the connection element (55) comprises a bearing element (79), on which a connecting member (90) associated with the wiper arm (18) can be supported.

7. A wiper blade according to claim 1, wherein the first and second adapter holders and the connection element are mounted end-to-end on the base connection device and a length in the axial direction of the first and second adapter holders and the connection element while mounted on the base connection device is substantially equal to a length in the axial direction of the base connection device.

8. A wiper blade (10) for a windshield wiper, the wiper blade comprising a wiper strip (12) having an axial direction, a base connection device (60) mounted on the wiper strip, a spoiler (20) mounted on the wiper strip, and an adapter unit (50) for attaching the wiper strip (12) to a wiper arm (18), wherein the spoiler includes first and second spoiler sections that are spaced apart in the axial direction, wherein the base connection device is located between the spoiler sections, wherein the adapter unit (50) is mounted on the base connection device (60), wherein the adapter unit (50) comprises a first adapter holder (52), a second adapter holder (58) and a connection element (55) each formed separately from the base connection device (60), each formed separately from each other and each mounted on the base connection device (60), wherein the first adapter holder (52) and the second adapter holder (58) are mounted on the base connection device independently of the connection element at a distance from each other in the axial direction of the wiper strip and have respective catch elements (51, 59) facing each other, wherein the connection element (55) is mounted on the base connection device between the first adapter holder (52) and the second adapter holder (58) and engages the catch elements (51, 59) of the first and second adapter holders, wherein the connection element (55) is configured to connect with the wiper arm (18), wherein the first adapter holder is separate from and overlaps the first spoiler section, wherein the second adapter holder is separate from and overlaps the second spoiler section, wherein the connection element (55) comprises counter catch elements (54, 56) which are engaged with the catch elements (51, 59) of the adapter holders (52, 58), and wherein the catch elements (51, 59) comprise projections (41, 49) facing the connection element (55) and the counter catch elements (54, 56) comprise resilient detent tongues (53, 57) which are engaged on the projections (41, 49).

9. A wiper blade according to claim 8, wherein the first and second adapter holder (52, 58) are permanently engaged at the base connection device (60) and the connection element (55) is detachably engaged at the first and second adapter holder (52, 58).

10. A wiper blade according to claim 8, wherein the counter catch elements (54, 56) can be actuated in order to enable a release of a present engagement between said counter catch elements (54, 56) and the catch elements (51, 59).

11. A wiper blade according to claim 8, wherein the distance (99) in the axial direction of the wiper strip (12) between the first and second adapter holder (52, 58) substantially corresponds to a longitudinal extent (88) of the connection element (55).

12. A wiper blade according to claim 8, wherein the first and second adapter holders and the connection element are mounted end-to-end on the base connection device and a length in the axial direction of the first and second adapter holders and the connection element while mounted on the base connection device is substantially equal to a length in the axial direction of the base connection device.

13. A wiper blade (10) for a windshield wiper, the wiper blade comprising a wiper strip (12) having an axial direction, a base connection device (60) mounted on the wiper strip, a spoiler (20) mounted on the wiper strip, and an adapter unit (50) for attaching the wiper strip (12) to a wiper arm (18), wherein the spoiler includes first and second spoiler sections that are spaced apart in the axial direction, wherein the base connection device is located between the spoiler sections, wherein the adapter unit (50) is mounted on the base connection device (60), wherein the adapter unit (50) comprises a first adapter holder (52), a second adapter holder (58) and a connection element (55) each formed separately from the base connection device (60), each formed separately from each other and each mounted on the base connection device (60), wherein the first adapter holder (52) and the second adapter holder (58) are permanently engaged on the base connection device independently of the connection element at a distance from each other in the axial direction of the wiper strip and have respective catch elements (51, 59) facing each other, wherein the connection element (55) is detachably engaged on the base connection device between the first adapter holder (52) and the second adapter holder (58) and detachably engages the catch elements (51, 59) of the first and second adapter holders, wherein the connection element (55) is configured to connect with the wiper arm (18), wherein the first adapter holder is separate from the first spoiler section, wherein the second adapter holder is separate from the second spoiler section, wherein the connection element is engageable with the base connection device by pushing the connection element between the adapter holders and is disengageable from the base connection device by pulling the connection element from between the adapter holders, wherein the connection element (55) comprises counter catch elements (54, 56) which engage the catch elements (51, 59) of the adapter holders (52, 58) when the connection element is pushed between the adapter holders, and wherein the counter catch elements (54, 56) are compressible in the axial direction to release engagement between said counter catch elements (54, 56) and the catch elements (51, 59).

14. A wiper blade according to claim 13 wherein the catch elements (51, 59) comprise projections (41, 49) facing the connection element (55) and the counter catch elements (54,

56) comprise resilient detent tongues (53, 57) which are engageable with the projections (41, 49).

15. A wiper blade according to claim 13, wherein the distance (99) in the axial direction of the wiper strip (12) between the first and second adapter holder (52, 58) substantially corresponds to a longitudinal extent (88) of the connection element (55).

16. A wiper blade according to claim 13, wherein the first and second adapter holder (52, 58) each include a longitudinal groove (42, 48) for receiving a respective one of end regions (14, 16) of the spoiler (25) provided on the wiper strip (12).

17. A wiper blade according to claim 13, wherein the first and second adapter holders and the connection element are mounted end-to-end on the base connection device and a length in the axial direction of the first and second adapter holders and the connection element while mounted on the base connection device is substantially equal to a length in the axial direction of the base connection device.

* * * * *